United States Patent
Das et al.

(10) Patent No.: US 12,524,062 B2
(45) Date of Patent: Jan. 13, 2026

(54) HINT-BASED FINE-GRAINED DYNAMIC VOLTAGE AND FREQUENCY SCALING IN GPUS

(71) Applicant: ADVANCED MICRO DEVICES, INC., Santa Clara, CA (US)

(72) Inventors: Shomit N. Das, Austin, TX (US); Joseph L. Greathouse, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/213,126

(22) Filed: Dec. 7, 2018

(65) Prior Publication Data

US 2020/0183485 A1 Jun. 11, 2020

(51) Int. Cl.
- *G06F 1/32* (2019.01)
- *G06F 1/324* (2019.01)
- *G06F 1/3287* (2019.01)
- *G06F 1/3296* (2019.01)

(52) U.S. Cl.
CPC ............ *G06F 1/3287* (2013.01); *G06F 1/324* (2013.01); *G06F 1/3296* (2013.01)

(58) Field of Classification Search
CPC ..................................... G06F 1/26; G06F 1/32
See application file for complete search history.

(56) References Cited

U.S. PATENT DOCUMENTS

| | | | | |
|---|---|---|---|---|
| 5,586,332 | A * | 12/1996 | Jain | G06F 9/3869 713/322 |
| 5,815,693 | A * | 9/1998 | McDermott | G06F 1/08 713/501 |
| 10,038,744 | B1 * | 7/2018 | Dagan | H04L 43/0817 |
| 10,585,801 | B2 * | 3/2020 | Jayasena | G06F 8/4442 |
| 10,614,541 | B2 * | 4/2020 | Storey | G09G 5/363 |
| 2004/0205757 | A1 * | 10/2004 | Pering | G06F 1/3203 718/102 |
| 2008/0235697 | A1 * | 9/2008 | Kobayashi | G06F 9/5027 718/103 |

(Continued)

OTHER PUBLICATIONS

Wu, Gene, et al., "GPGPU Performance and Power Estimation Using Machine Learning", 2015 IEEE 21st International Symposium on High Performance Computer Architecture (HPCA), Feb. 7-11, 2015, 13 pages.

(Continued)

*Primary Examiner* — Phil K Nguyen

(57) ABSTRACT

A processing system dynamically scales at least one of voltage and frequency at a subset of a plurality of compute units of a graphics processing unit (GPU) based on characteristics of a kernel or workload to be executed at the subset. A system management unit for the processing system receives a compute unit mask, designating the subset of a plurality of compute units of a GPU to execute the kernel or workload, and workload characteristics indicating the compute-boundedness or memory bandwidth-boundedness of the kernel or workload from a central processing unit of the processing system. The system management unit determines a dynamic voltage and frequency scaling policy for the subset of the plurality of compute units of the GPU based on the compute unit mask and the workload characteristics.

17 Claims, 4 Drawing Sheets

(56) References Cited

U.S. PATENT DOCUMENTS

| | | | | |
|---|---|---|---|---|
| 2008/0270199 | A1* | 10/2008 | Chess | G06F 9/505 |
| | | | | 705/7.26 |
| 2011/0050713 | A1* | 3/2011 | McCrary | G06F 9/3851 |
| | | | | 345/522 |
| 2011/0213950 | A1* | 9/2011 | Mathieson | G06F 9/5094 |
| | | | | 712/30 |
| 2012/0131593 | A1* | 5/2012 | DePetro | G06F 9/5088 |
| | | | | 718/105 |
| 2012/0159496 | A1* | 6/2012 | Dighe | G06F 9/4893 |
| | | | | 718/102 |
| 2013/0160016 | A1* | 6/2013 | Gummaraju | G06F 9/5044 |
| | | | | 718/102 |
| 2013/0235053 | A1* | 9/2013 | Bourd | G06F 9/5044 |
| | | | | 345/522 |
| 2013/0300655 | A1* | 11/2013 | Cameron | G06F 9/5016 |
| | | | | 345/157 |
| 2013/0322128 | A1* | 12/2013 | Takegami | H02M 3/33507 |
| | | | | 363/17 |
| 2014/0149677 | A1* | 5/2014 | Jayasena | G06F 8/4442 |
| | | | | 711/137 |
| 2015/0170318 | A1* | 6/2015 | Gould | G06T 1/20 |
| | | | | 345/505 |
| 2016/0026479 | A1* | 1/2016 | Rosenzweig | G06F 12/0844 |
| | | | | 710/104 |
| 2016/0054782 | A1* | 2/2016 | Kaburlasos | G06F 1/324 |
| | | | | 713/320 |
| 2016/0116954 | A1* | 4/2016 | Zhuang | G06F 1/26 |
| | | | | 713/300 |
| 2018/0033114 | A1* | 2/2018 | Chen | G06T 1/20 |
| 2018/0039523 | A1* | 2/2018 | Akamine | G06F 9/5044 |
| 2018/0108106 | A1* | 4/2018 | Socarras | G06T 1/20 |
| 2018/0108166 | A1* | 4/2018 | Oreifej | G06T 15/005 |
| 2018/0286005 | A1* | 10/2018 | Koker | G06F 9/5011 |
| 2018/0373562 | A1* | 12/2018 | Roberts | G06F 9/4887 |
| 2019/0050040 | A1* | 2/2019 | Baskaran | G06F 1/3275 |
| 2019/0362461 | A1* | 11/2019 | George | G06T 1/20 |
| 2020/0103953 | A1* | 4/2020 | Sadowski | G06F 1/3228 |
| 2020/0104170 | A1* | 4/2020 | Else | G06F 9/4887 |
| 2021/0200255 | A1* | 7/2021 | Alla | G06T 1/20 |

OTHER PUBLICATIONS

Hong, Sunpyo, et al., "An Integrated GPU Power and Performance Model", International Symposium on Computer Architecture (ISCA), Jun. 19-23, 2010, 10 pages.

Majumdar, Abhinandan, et al., "Dynamic GPGPU Power Management Using Adaptive Model Predictive Control", 2017 IEEE International Symposium on High Performance Computer Architecture (HPCA), Feb. 4-8, 2017, 12 pages.

Lee, Jungseob, et al., "Improving Throughput of Power-Constrained GPUs Using Dynamic Voltage/Frequency and Core Scaling", 2011 International Conference on Parallel Architectures and Compilation Techniques, Oct. 10-14, 2011, 10 pages.

Kamakshi, Divya Akella, et al., "Modeling and Analysis of Power Supply Noise Tolerance with Fine-Grained GALS Adaptive Clocks", 2016 22nd IEEE Symposium on Asynchronus Circuits and Systems (ASYNC), May 8-11, 2016, 44 pages.

Meinerzhagen, Pascal, et al., "An Energy-Efficient Graphics Processor Featuring Fine-Grain DVFS with Integrated Voltage Regulators, Execution-Unit Turbo, and Retentive Sleep in 14nm Tri-Gate CMOS", 2018 IEEE International Solid-State Circuits Conference (ISSCC), Feb. 11-15, 2018, 3 pages.

* cited by examiner

HINT-BASED FINE-GRAINED DYNAMIC VOLTAGE AND FREQUENCY SCALING IN GPUS

GOVERNMENT LICENSE RIGHTS

This invention was made with government support under PathForward project with Lawrence Livermore National Security (Prime Contract No. DE-AC52-07NA27344, Subcontract No. B620717) awarded by DOE. The Government has certain rights in this invention.

BACKGROUND

High-performance processing systems include multiple processing units, such as graphics processing unit (GPU) cores, and memory systems. GPU cores have parallel compute units that process multiple operations and request access to memory systems concurrently through memory channels. Conventional processing units such as GPUs support virtualization that allows multiple virtual machines (VMs) to use the hardware resources of the GPU to emulate separate and independent processors. For example, a processing unit, a memory, and other hardware in a processing system together can be used to implement multiple VMs, with each VM functioning as a complete system platform that can execute a complete operating system when it is loaded into the processing unit. In many applications, such as graphics processing in a GPU, a sequence of workloads (i.e., programs including multiple lines of code referred to as kernels) are placed in queues to be processed in order to output a final result.

Power efficiency is desirable when running high utilization machine intelligence workloads on specialized hardware. Computations and memory accesses consume a significant amount of power in processing systems. Power management techniques such as dynamic voltage and frequency scaling (DVFS) are utilized to dynamically adjust an operating voltage and frequency point (referred to as a "p-state") across GPU components during run time to improve processing performance within a fixed processor power budget.

Some DVFS managers make DVFS policy decisions based on environmental conditions, such as power and thermal headroom, and performance measurements of a workload executed at a particular DVFS setting during a previous time interval. However, such observation-based metrics limit the efficiency of a DVFS manager, both because by the time an observation has been made, the characteristics of the workload may have changed, and because the observation itself consumes resources of the DVFS manager.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
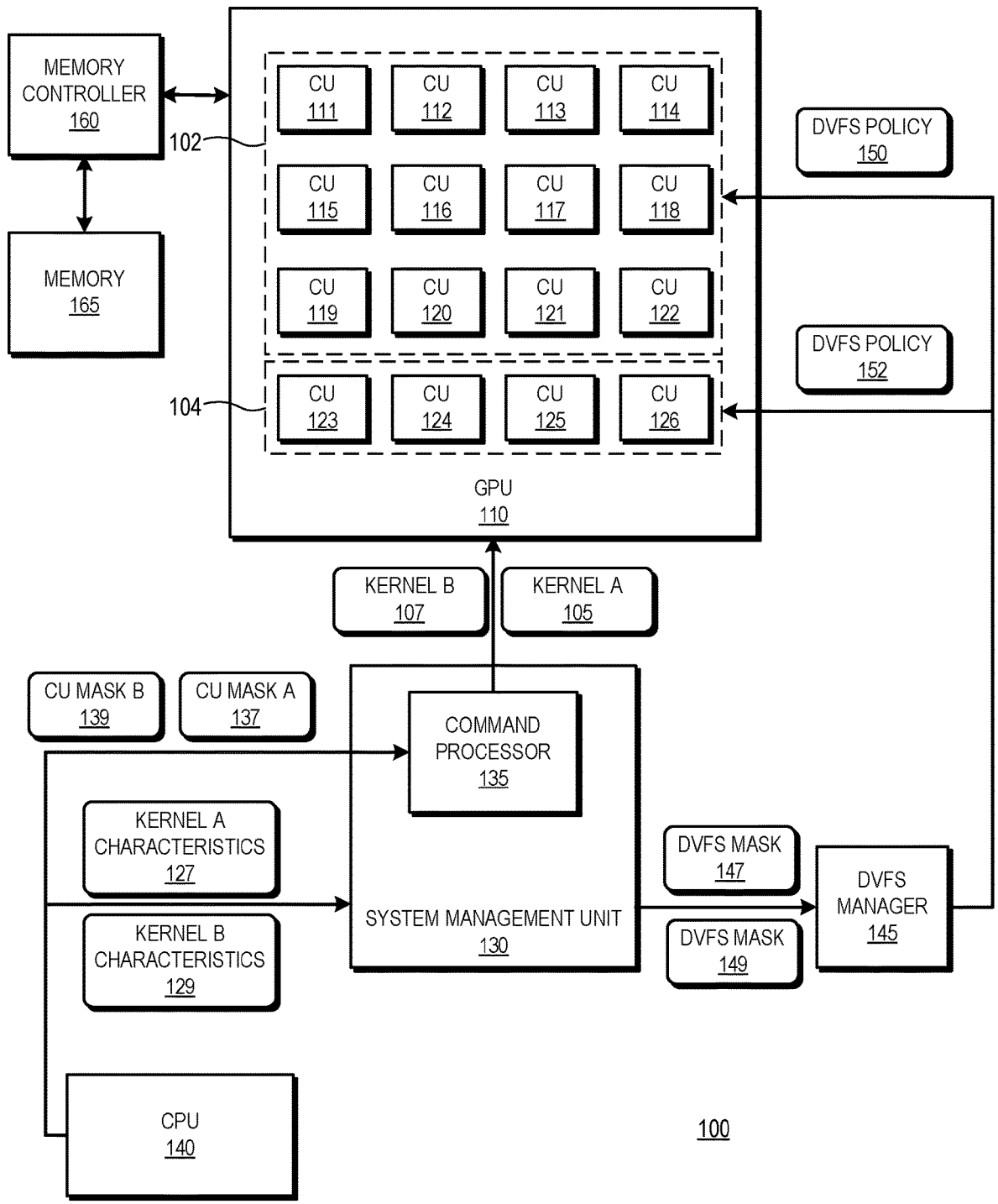
FIG. 1 is a block diagram of a processing system applying fine-grained dynamic frequency and voltage scaling to subsets of compute units of a graphics processing unit based on software hints in accordance with some embodiments.

FIGS. 1-4 illustrate techniques for dynamically scaling voltage and frequency at a subset of compute units of a graphics processing unit based on characteristics of a workload to be executed at the subset. A system management unit (SMU) for a processing system receives a compute unit mask (CU mask), designating a subset of compute units of a GPU, and workload characteristics for a workload from a processor. The CU mask and workload characteristics are provided in the form of software hints programmed by a user. The SMU determines a dynamic voltage and frequency scaling (DVFS) policy for the GPU based on the CU mask and the workload characteristics.

For example, if the CU mask indicates that particular CUs are to be assigned to execute a workload and the workload's characteristics indicate that the workload is computationally intensive, the SMU determines a DVFS policy for the workload that increases at least one of the voltage and frequency applied to the assigned CUs for the time the workload is executing. On the other hand, if the workload's characteristics indicate that the workload is limited by available memory bandwidth, the SMU determines a DVFS policy for the workload that decreases at least one of the voltage and frequency applied to the CUs for the time the workload is executing. A DVFS manager applies the DVFS policy to the GPU, thereby rapidly adapting the p-state of the assigned CUs to the characteristics of the workload they are executing.

A single GPU includes multiple (in some cases up to hundreds of) compute units (CUs) or work-group processors (WGPs). Users have the option to run multiple compute workloads on a single GPU simultaneously, including applying a CU mask to divide a single GPU into multiple smaller virtual devices that include only the CUs within the mask. Further, in a virtualized environment, multiple VMs use the hardware resources of the GPU to emulate separate and independent processors. Within a single VM that is assigned a plurality of CUs of the GPU, the VM can set a CU mask designating a subset of the plurality of assigned CUs to execute a given workload. Accordingly, there will be situations in which multiple workloads across a variety of VMs, each with different characteristics, will share the same GPU. In some situations, multiple workloads from a single VM, or multiple workloads from a single process, all having different characteristics, will share the same GPU.

The maximum power for a processor (referred to as the thermal design power, or TDP) is set based on running a heavy workload under worst-case conditions. The TDP is an upper bound for the sustainable power draw of the processor and is used to determine the cooling system requirements. Under normal operating conditions, however, not all components are active at the same time or to the same extent, leaving thermal headroom in the system. The thermal headroom allows for an increase in the frequency of the active compute units until either the maximum performance state is set or the thermal limit is reached.

Fast on-die digital low drop-out regulator circuits and digital frequency locked loop circuits facilitate fine-grained DVFS in GPUs, such that a DVFS manager is able to rapidly change the voltage and frequency (V-F) of small subsets of large GPU designs. Fine-grained DVFS divides a GPU into sets of CUs (referred to as V-F domains) that have voltage and frequency (V-F) control that is independent from other V-F domains. The relative size of each V-F domain compared to the GPU as a whole determines the DVFS granularity of the GPU.

DVFS efficiency is workload-dependent. For example, running a subset of CUs assigned to execute a workload at a high voltage and frequency (p-state) wastes power without necessarily increasing performance if the workload is limited by available memory bandwidth. Conversely, running a computationally bound workload at a low e-state has the potential to cause unacceptable performance losses, or even to cause the workload to use more energy. If a system management unit (SMU) is aware of the characteristics of a kernel or workload (e.g., if the kernel is compute-intensive or bandwidth-intensive), the SMU is able to make a more informed determination of the e-state assigned to the CUs running the kernel. For example, the SMU will avoid assigning deep sleep states to CUs with kernels that are known to not exhibit long memory cycles or stalls.

Conventional DVFS policies make reactive determinations of p-states based on observed measurements of how a kernel performed during a previous time interval. However, such observation-based DVFS policies suffer from inefficiencies due to the time and resources needed to measure performance and the fact that a kernel's characteristics and environmental conditions such as thermal headroom change over time, such that previously observed measurements are not necessarily accurate predictions of how a current kernel will perform. By pre-profiling kernels and providing kernel or workload characteristics to the SMU before the kernels execute at the GPU, the SMU proactively determines the most efficient p-states for the CUs assigned to run the kernels, resulting in improved efficiency.

FIG. 1 illustrates a processing system 100 applying fine-grained dynamic frequency and voltage scaling to subsets of compute units of a graphics processing unit based on the characteristics of kernels or workloads (i.e., programs including several kernels) executing at the subsets in accordance with some embodiments. The processing system 100 includes a central processing unit (CPU) 140, a graphics processing unit (GPU) 110, a memory controller 160 and memory 165, a system management unit (SMU) 130, and a DVFS manager 145. Some embodiments of the processing system 100 include additional CPUs, GPUs, buses, bridges, switches, routers, a display, and the like, which are not shown in FIG. 1 in the interest of clarity.

The GPU 110 includes a plurality of compute units (CUs) 111-126 that are generally configured to execute sets of instructions (e.g., computer programs) that manipulate the circuitry of the GPU 110 to carry out defined tasks to render images for presentation on a display (not shown). For example, the GPU 110 renders objects to produce values of pixels that are provided to the display, which uses the pixel values to display an image that represents the rendered objects. The CUs 111-126, a set of fixed function units, or a combination thereof, execute instructions concurrently or in parallel. In some embodiments, the GPU 110 includes tens or hundreds of compute units or fixed function units for executing instructions.

The memories 165 facilitates the execution of tasks performed by the GPU 110 by storing data used by the GPU 110. The memory 165 can be random access memory (RAM), non-volatile memory such as flash memory or a hard disk drive (HDD), and the like, or a combination thereof. The memory controller 160 provides an interface for the GPU 110 to communicate with the memories 165. The memory controller 160 receives memory access requests from the GPU 110, and controls provision of those requests to the memory 165. In addition, the memory controller 160 receives responses to memory access requests from the memory 165 and controls provision of the responses to the GPU 110.

As a general operational overview, the CPU 140 executes software applications (not shown) that are represented as one or more sets of executable instructions stored, for example, in the memories 165 until accessed for execution. During the course of execution, the CPU 140 delegates a task (e.g., the rendering of a display image) to the GPU 110 by sending one or more command packets representing the workload to command ring buffers (not shown) implemented in the memory 165. The GPU 110 accesses the one or more command packets from the command ring buffers via the memory controller 160, and processes the one or more command packets.

Typically, at least some instructions in a kernel rely on data accessed from the memory 165 (e.g., data representing primitives or textures during an image rendering workload), and thus execution of such instructions at the GPU 110 triggers the GPU 110 to initiate a memory access operation to obtain the data from the memory 165. In the course of executing the sets of instructions, the GPU 110 generates memory access requests, including write requests to store data at the memory 165 and read requests to retrieve data from the memory 165. Each memory access request includes a memory address (e.g., a system physical address) indicating a location at the memory 165 targeted by the memory access request. In response to a read request, the memory 165 retrieves information (data or instructions) stored at the location corresponding to the memory address of the read request and provides the information to the GPU 110. In response to a write request, the memory 165 stores write information of the request at the location corresponding to the memory address of the write request.

The system management unit 130 manages thermal and power conditions of the processing system 100 to optimize performance and power efficiency. The system management unit 130 is implemented as hard-coded logic of the processing system 100, as firmware or programmable logic of the processing system 100, or a combination thereof. The system management unit 130 includes a command processor 135 configured to receive CU masks from the CPU 140 and queue workloads and their corresponding CU masks to the GPU 110. The system management unit 130 receives workload characteristics from the CPU 140 indicating characteristics such as the compute-boundedness or memory bandwidth-boundedness of workloads that are to be queued to the GPU 110. The DVFS manager 145 receives the DVFS mask from the system management unit 130 and applies a DVFS policy consistent with the DVFS mask to the CUs assigned to execute the workload.

To improve processing efficiency, the system management unit 130 generates a DVFS mask for each workload, designating the p-states of the CUs assigned by the CU mask to execute the workload, based on the characteristics of the workload. In some embodiments, the system management unit 130 translates the characteristics of the workload into a set of acceptable p-states that the CUs running the workload are allowed to enter into. For example, if the characteristics indicate that the workload does not exhibit long memory cycles or stalls, the DVFS mask indicates that the DVFS manager 145 is to avoid assigning deep sleep states to CUs running the workload.

To illustrate, in operation, the CPU 140 provides to the system management unit 130 two kernels—kernel A 105 and kernel B 107—with corresponding CU mask A 137, specifying which CUs should be active during execution of kernel A 105, and CU mask B 139, specifying which CUs should be active during execution of kernel B 107. The CPU 140 also provides to the system management unit 130 kernel A characteristics 127, indicating the compute-boundedness or memory bandwidth-boundedness of kernel A 105, and kernel B characteristics 129, indicating the compute-boundedness or memory bandwidth-boundedness of kernel B 107. In some embodiments, the characteristics of each kernel are determined based on application or kernel profiling tools such as ROCProfiler, Nvidia Visual Profiler, and HLSim. Such profiling tools enable the CPU 140 to perform roofline analyses and extract data pertaining to memory and compute intensity of individual kernels.

In the illustrated example, the CU mask A 137 indicates that kernel A 105 is to run on a subset 102 of CUs (CUs 111-122), and the CU mask B 139 indicates that kernel B 107 is to run on a subset 104 of CUs (CUs 123-126). The system management unit 130 translates the kernel A characteristics 127 into a set of acceptable p-states that the subset 102 of CUs (CUs 111-122) are allowed to enter into while executing kernel A 105. The system management unit 130 encodes the set of acceptable p-states as a software DVFS mask 147. For example, if the kernel A characteristics 127 indicate that kernel A 105 is highly compute-bound, the system management unit 130 encodes a DVFS mask 147 allowing high p-states for the subset 102. Similarly, the system management unit 130 translates the kernel B characteristics 129 into a set of acceptable p-states that the subset 104 of CUs (CUs 123-126) are allowed to enter into while executing kernel B 107. In some embodiments, the set of acceptable p-states are provided as a set of discrete voltage or frequency settings (or both) that are acceptable for the subset. The system management unit 130 encodes the set of acceptable p-states as a software DVFS mask 149. Thus, if the kernel B characteristics 129 indicate that kernel B 107 is highly memory bandwidth-bound, the system management unit 130 encodes a DVFS mask 149 allowing low p-states for the subset 104.

The system management unit 130 provides the DVFS mask 147 and the DVFS mask 149 to the DVFS manager 145. The DVFS manager 145 determines a DVFS policy 150 for the subset 102 based on the acceptable p-states indicated by the DVFS mask 147 and determines a DVFS policy 152 for the subset 104 based on the acceptable p-states indicated by the DVFS mask 149. In this example, the subsets 102 and 104 are within the granularity of the V-F domain level of the GPU 110. The DVFS manager 145 uses the information in the DVFS masks 147, 149 to proactively estimate the most efficient p-state for each of the subsets 102, 104 without having to wait for the kernels 105, 107 to reach steady state and without needing to estimate p-states based on observations of how the kernels 105, 107 use the GPU 110 hardware. For example, the lists of acceptable p-states indicated by the DVFS masks 147, 149 could exclude deep sleep states or low frequencies for kernels with high compute-boundedness and limited memory activity, allowing the CUs of the subsets 102, 104 to minimize transition time between p-states. The DVFS manager 145 applies the DVFS policy 150 to the subset 102 and applies the DVFS policy 152 to the subset 104. Thus, for example, if the kernel A characteristics 137 indicate that the kernel A 105 is highly compute-bound, the DVFS manager 145 applies a DVFS policy 150 to the subset 102 that increases the voltage or frequency (or both) of the subset 102 in proportion to the compute-boundedness of the kernel A 105. Conversely, if the kernel B characteristics 139 indicate that the kernel d B 107 is highly memory bandwidth-bound, the DVFS manager 145 applies a DVFS policy 152 to the subset 104 that decreases the voltage or frequency (or both) of the subset 102 in proportion to the memory bandwidth-boundedness of the kernel B 107.

Figure 2:
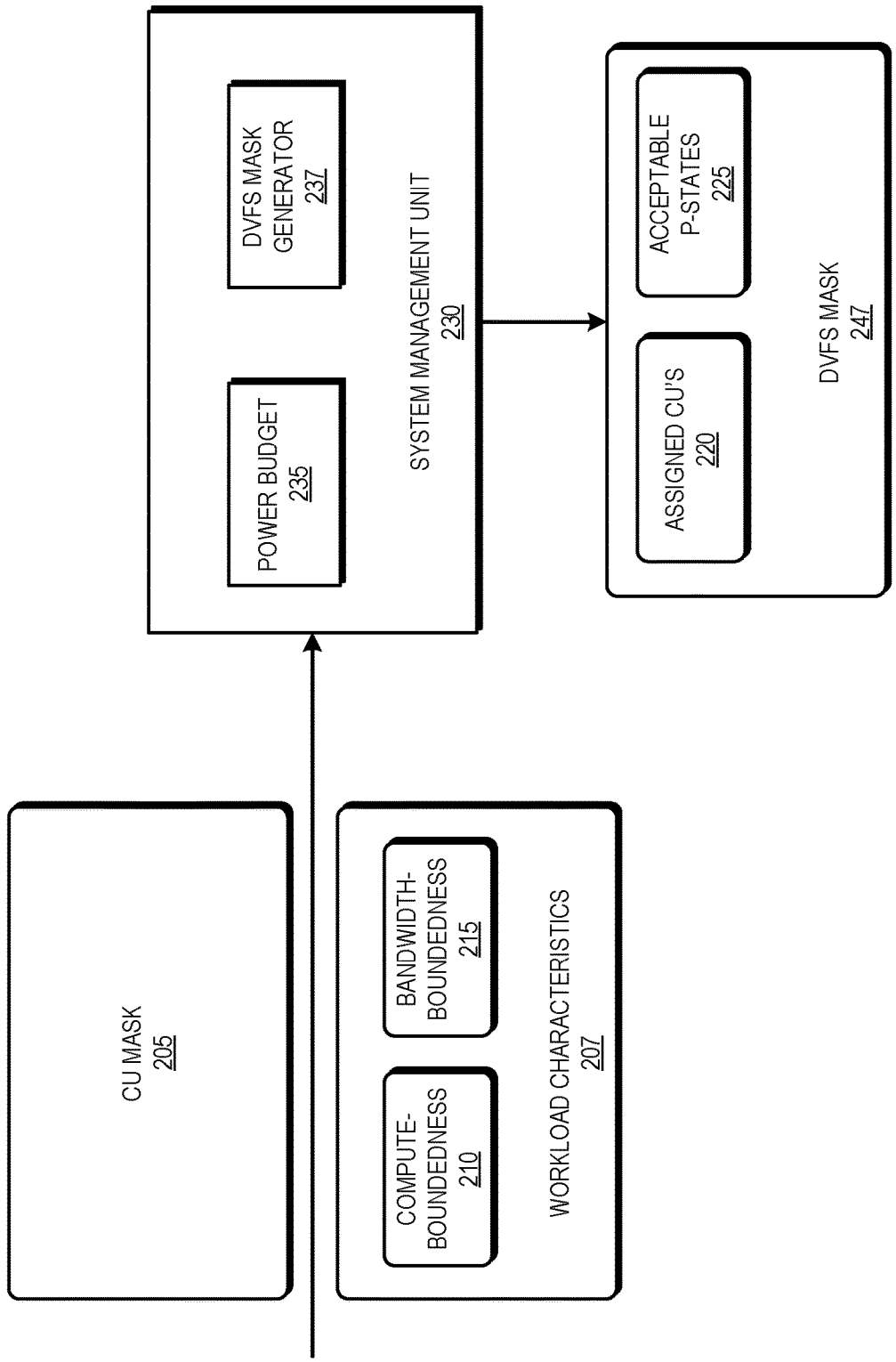
FIG. 2 is a block diagram of a system management unit of the processing system configured to generate a DVFS mask to applying DVFS to a subset of compute units of a GPU based on software hints in accordance with some embodiments.

FIG. 2 is a block diagram of a system management unit 230 (such as SMU 130 of the processing system 100 of FIG. 1) configured to generate a DVFS mask 247 based on software hints in accordance with some embodiments. The system management unit 230 receives a CU mask 205 for a kernel or workload (not shown) indicating the subset of CUs of a GPU that are assigned to run the kernel or workload. The system management unit 230 also receives workload characteristics 207, which are software hints indicating the compute-boundedness 210 and bandwidth-boundedness 215 of the kernel or workload.

The system management unit 230 includes a power budget 235 and a DVFS mask generator 237. The power budget 235 is the power available for the GPU at a given point in time. The DVFS mask generator 237 translates the workload characteristics 207 of the workload into a set of acceptable p-states for the subset of CUs assigned by the CU mask 205 based on the power budget 235 and encodes the set of acceptable p-states 225 in a DVFS mask 247. The DVFS mask 247 also indicates the assigned CUs 220.

In some embodiments, the system management unit 230 provides a DVFS mask 247 on a per-compute queue basis. By providing a DVFS mask for each compute queue, the system management unit 230 enables the creation of separate queues for compute-bound and bandwidth-bound workloads. The system management unit 230 uses cross-queue dependencies to maintain appropriate orders between queues. By creating separate queues for workloads based on workload characteristics, the system management unit 230 segments off workloads having similar characteristics into subsets of the GPU hardware, thereby facilitating fine-grained DVFS decisions. For example, if multiple compute-bound kernels and multiple memory bandwidth-bound kernels are in flight, the system management unit 230 sequesters the compute-bound kernels into queues with compute-bound software hints and encodes a DVFS mask 247 indicating high p-states as being acceptable. Conversely, the system management unit 230 sequesters the bandwidth-bound kernels into queues with bandwidth-bound software hints and encodes a DVFS mask 247 indicating that low p-states are acceptable.

By sorting kernels into queues that are compatible with the characteristics of the kernels, the DVFS manager 145 of FIG. 1 is able to minimize overheads associated with p-state switching. For example, if a compute-bound kernel is designated to run on a first subset of CUs of a GPU, the DVFS manager 145 sets the voltage or frequency (or both) applied to the first subset of CUs at a high level. However, if a bandwidth-bound kernel is designated to run on a second subset of CUs of the GPU, the DVFS manager 145 sets the voltage or frequency (or both) applied to the second subset of CUs to a lower level and thereby saves GPU power.

Figure 3:
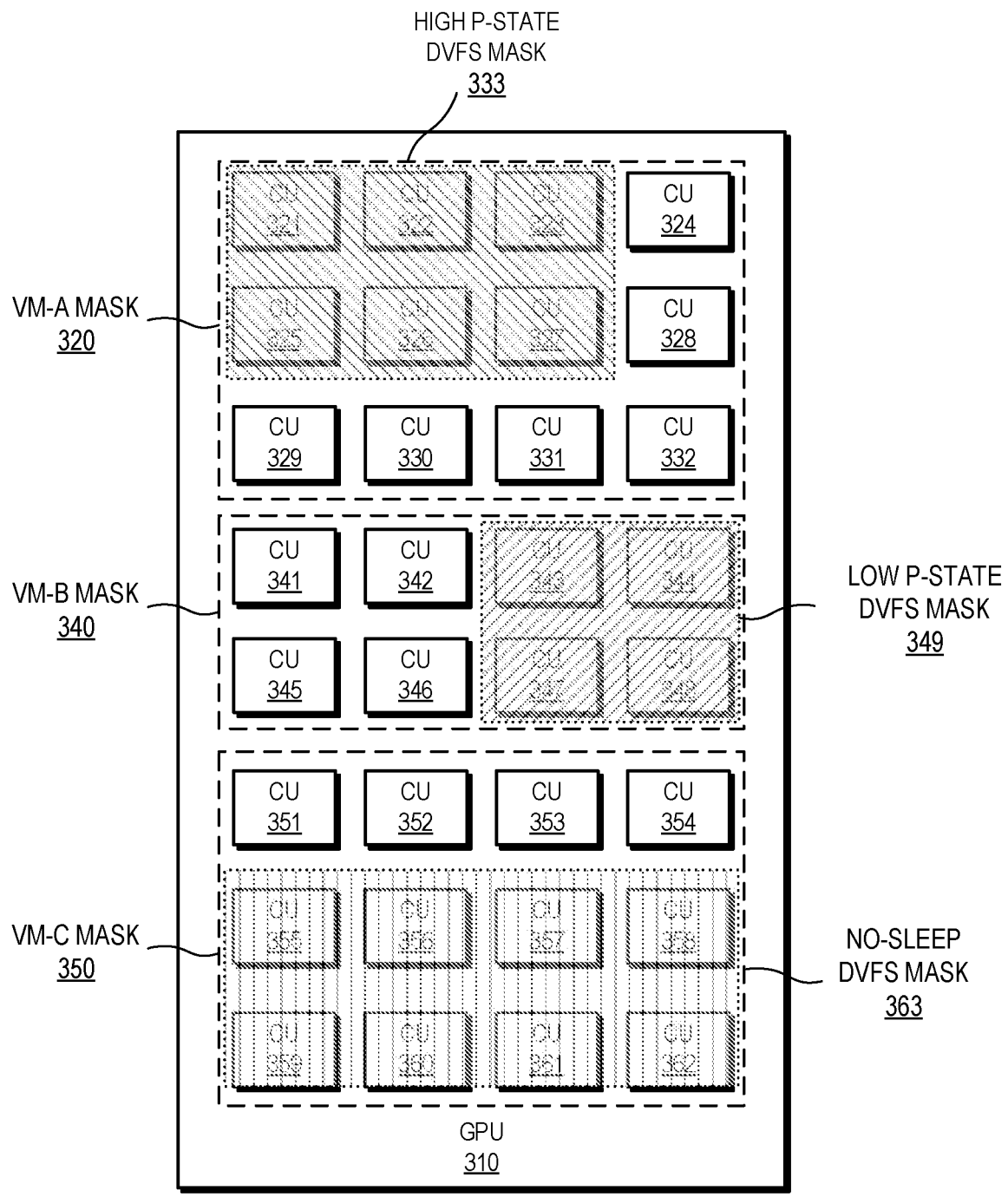
FIG. 3 is a block diagram of a GPU having multiple subsets of compute units assigned to different virtual machines, wherein each subset has a unique DVFS mask in accordance with some embodiments.

FIG. 3 is a block diagram of a GPU 310 having multiple subsets of compute units assigned to different virtual machines, or to different virtual memory spaces within the same virtual machine, wherein each subset has a unique DVFS mask in accordance with some embodiments. In some embodiments, the same process launching multiple separate kernels within the same virtual machine and virtual memory space is allocated to multiple separate CU and DVFS masks. For ease of illustration, in the illustrated example, the hardware of the GPU 310 has been allocated among three virtual machines (VMs)—VM-A, VM-B, and VM-C—each of which has a mask specifying which CUs of the GPU 310 are assigned to the VM. Thus, a VM-A mask 320 designates CUs 321-332 to execute kernels or workloads on behalf of VM-A, a VM-B mask 340 designates CUs 341-348 to execute kernels or workloads on behalf of VM-B, and a VM-C mask 350 designates CUs 351-362 to execute kernels or workloads on behalf of VM-C.

Each kernel or workload queued for processing by each of the subsets of CUs allocated to each VM is characterized with a CU mask (not shown) and workload characteristics (not shown). The system management unit (not shown) encodes in DVFS masks acceptable p-states for subsets of the CUs designated by the CU mask for each of the VM masks 320, 340, 350 based on the workload characteristics and the available power budget. For example, the DVFS mask 333 encodes a high p-state for CUs 321, 322, 323, 325, 326, and 327, which are designated by a CU mask (not shown) to execute a workload on behalf of VM-A, for a workload characterized as compute-bounded. The remaining CUs allocated to VM-A (CUs 324, 328, 329, 330, 331, and 332) will not receive any work from the workload executing on behalf of VM-A. The DVFS mask 349 encodes a low p-state for CUs 343, 344, 347, and 348, which are designated by a CU mask (not shown) to execute a workload on behalf of VM-B, for a workload characterized as memory bandwidth-bounded. The remaining CUs allocated to VM-B (CUs 341, 342, 345, and 346) will not receive any work from the workload executing on behalf of VM-B. The DVFS mask 363 encodes a no-sleep p-state for CUs 355-362, which are designated by a CU mask (not shown) to execute a workload on behalf of VM-C, for a workload characterized as highly compute-bounded and having little memory activity. The remaining CUs (CUs 351-354) will not receive any work from the workload executing on behalf of VM-C.

Figure 4:
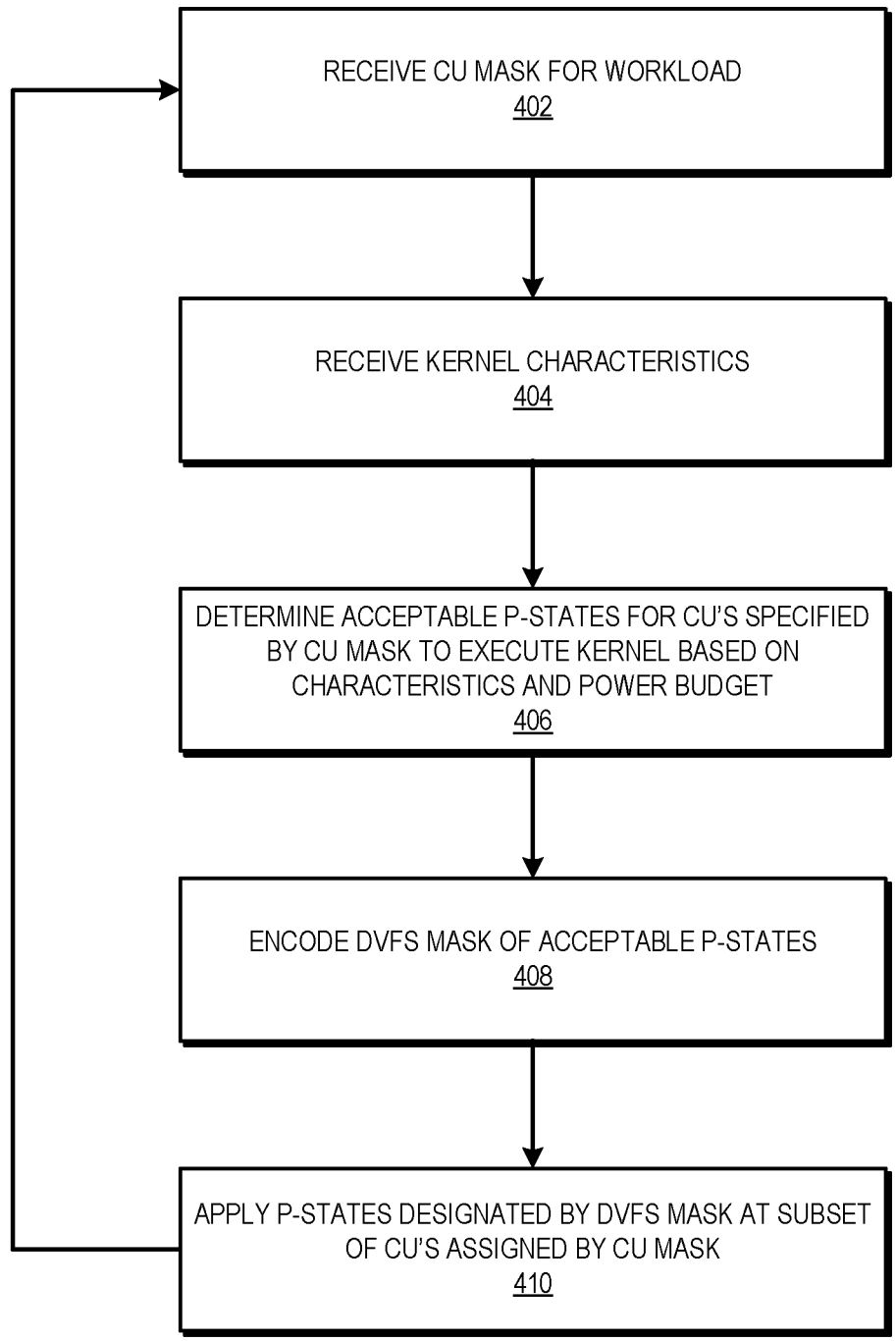
FIG. 4 is a flow diagram illustrating a method for generating and applying a DVFS mask to a subset of compute units of a GPU based on software hints in accordance with some embodiments.

FIG. 4 is a flow diagram illustrating a method 400 for generating and applying a DVFS mask to a subset of compute units of a GPU designated to execute a kernel or workload based on software hints regarding characteristics of the kernel in accordance with some embodiments. The method 400 is implemented in some embodiments of the processing system 100 shown in FIG. 1.

At block 402, the system management unit 130 receives a CU mask specifying a subset of CUs of the GPU 110 that are designated to process a kernel. At block 404, the system management unit 130 receives kernel characteristics indicating characteristics of the kernel, such as the compute-boundedness or memory bandwidth-boundedness of the kernel. At block 406, the system management unit 130 determines acceptable p-states for the CUs specified by the CU mask to execute the kernel, based on the kernel characteristics and the available power budget. For example, if the kernel characteristics indicate that the kernel is highly compute-bound and the available power budget allows, the system management unit 130 assigns a high p-state to the CUs specified by the CU mask during execution of the kernel.

At block 408, the system management unit 130 encodes a DVFS mask of acceptable p-states for the kernel. At block 410, the DVFS manager 145 applies a p-state designated by the DVFS mask as acceptable at the subset of CUs assigned by the CU mask to execute the kernel. The method flow then reverts back to block 402.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
for each kernel of a plurality of kernels to be executed:
receiving, at a system management unit, an indication of a subset of a plurality of compute units of a processing unit that are assigned to execute the kernel and a corresponding kernel mask comprising an indication of characteristics of the kernel before execution at the subset of the plurality of compute units; and
adjusting a voltage or a frequency of the subset of the plurality of compute units based on the characteristics of the kernel indicated by the kernel mask, wherein adjusting comprises setting the voltage or the frequency to one of a plurality of discrete voltage or frequency settings for the subset of the plurality of compute units assigned to the kernel based on the characteristics of the kernel.

2. The method of claim 1, wherein the characteristics comprise a compute-boundedness of the kernel.

3. The method of claim 2, wherein adjusting comprises increasing at least one of the voltage or frequency of the subset of the plurality of compute units in proportion to the compute-boundedness of the kernel.

4. The method of claim 1, wherein the characteristics comprise a memory bandwidth-boundedness of the kernel.

5. The method of claim 4, wherein adjusting comprises decreasing at least one of the voltage or frequency of the subset of the plurality of compute units in proportion to the memory bandwidth-boundedness of the kernel.

6. The method of claim 1, further comprising:
for each kernel of the plurality of kernels to be executed:
associating the kernel with the subset of the plurality of compute units and the adjusted voltage or frequency of the subset of the plurality of compute units; and
queuing the kernel, the subset of the plurality of compute units, and the adjusted voltage or frequency to the processing unit for execution.

7. A method, comprising:
for each kernel of a plurality of kernels to be executed:
associating a corresponding compute unit mask with the kernel before execution of the kernel at a processing unit comprising a plurality of compute units, the compute unit mask assigning a subset of the plurality of compute units to execute the kernel;
determining a dynamic voltage and frequency scaling (DVFS) policy for the subset of the plurality of compute units assigned to execute the kernel, based on characteristics of the kernel indicated by the compute unit mask; and
applying the DVFS policy at the subset of the plurality of compute units during execution of the kernel based on the compute unit mask, wherein applying the DVFS policy comprises setting a voltage or frequency to one of a plurality of discrete voltage or frequency settings for the subset of the plurality of compute units assigned to the kernel based on the characteristics of the kernel.

8. The method of claim 7, wherein the characteristics comprise a compute-boundedness of the kernel.

9. The method of claim 8, wherein the DVFS policy comprises increasing at least one of a voltage or frequency applied to the subset of the plurality of compute units in proportion to the compute-boundedness of the kernel.

10. The method of claim 7, wherein the characteristics comprise a memory bandwidth-boundedness of the kernel.

11. The method of claim 10, wherein the DVFS policy comprises decreasing at least one of a voltage or frequency applied to the subset of the plurality of compute units in proportion to the memory bandwidth-boundedness of the kernel.

12. The method of claim 7, further comprising:
for each kernel of the plurality of kernels to be executed:
associating the compute unit mask and the DVFS policy with the kernel; and
queuing the kernel, the compute unit mask, and the DVFS policy to the processing unit for execution of the kernel.

13. A device, comprising:
a processing unit comprising a plurality of compute units;
a system management unit configured to:
for each kernel of a plurality of kernels:
assign a subset of the plurality of compute units to execute the kernel before execution of the kernel; and
determine, before execution of the kernel by the subset of the plurality of compute units, a DVFS policy for the kernel based on characteristics of the kernel indicated by a corresponding kernel mask; and
a dynamic voltage and frequency scaling (DVFS) manager to:
for each kernel of the plurality of kernels, apply the DVFS policy to the subset of the plurality of compute units during execution of the kernel at the subset based on the kernel mask, wherein applying the DVFS policy comprises setting a voltage or frequency to one of a plurality of discrete voltage or frequency settings for the subset of the plurality of compute units assigned to the kernel based on the characteristics of the kernel.

14. The device of claim 13, wherein the characteristics comprise a compute-boundedness of the kernel.

15. The device of claim 14, wherein the DVFS policy comprises increasing at least one of a voltage or frequency of the subset of the plurality of compute units in proportion to the compute-boundedness of the kernel.

16. The device of claim 13, wherein the characteristics comprise a memory bandwidth-boundedness of the kernel.

17. The device of claim 16, wherein the DVFS policy comprises decreasing at least one of a voltage or frequency of the subset of the plurality of compute units in proportion to the memory bandwidth-boundedness of the kernel.

* * * * *